US006925265B2

(12) United States Patent
Franco et al.

(10) Patent No.: US 6,925,265 B2
(45) Date of Patent: Aug. 2, 2005

(54) SYSTEM AND METHOD OF HIGH-SPEED TRANSMISSION AND APPROPRIATE TRANSMISSION APPARATUS

(75) Inventors: Pierluigi Franco, Padua (IT); Giorgio Grasso, Monza (IT); Matjaz Vidmar, Nova Gorica (SI)

(73) Assignee: Cisco Photonics Italy S.r.L., Milan (IT)

( * ) Notice: Subject to any disclaimer, the term of this patent is extended or adjusted under 35 U.S.C. 154(b) by 18 days.

(21) Appl. No.: 10/822,029

(22) Filed: Apr. 8, 2004

(65) Prior Publication Data

US 2004/0190911 A1 Sep. 30, 2004

Related U.S. Application Data

(63) Continuation of application No. 09/497,694, filed on Feb. 3, 2000, which is a continuation of application No. PCT/EP98/04782, filed on Jul. 31, 1998.
(60) Provisional application No. 60/054,945, filed on Aug. 7, 1997.

(30) Foreign Application Priority Data

Aug. 4, 1997 (EP) .............................................. 97113436

(51) Int. Cl.⁷ .............................................. H04B 10/04
(52) U.S. Cl. ...................................... 398/189; 398/147
(58) Field of Search ................................ 398/147, 148, 398/189, 190, 191

(56) References Cited

U.S. PATENT DOCUMENTS

| 4,093,919 | A | 6/1978 | Watanabe | 455/142 |
|---|---|---|---|---|
| 4,239,336 | A | 12/1980 | Parfree et al. | 385/101 |
| 5,157,744 | A | 10/1992 | Korotky | 385/2 |
| 5,247,518 | A | 9/1993 | Takiyasu et al. | 370/466 |
| 5,267,073 | A | 11/1993 | Tamburello et al. | 359/179 |
| 5,361,319 | A | 11/1994 | Antos et al. | 385/123 |
| 5,504,609 | A | 4/1996 | Alexander et al. | 398/91 |
| 5,521,738 | A | * 5/1996 | Froberg et al. | 398/183 |
| 5,570,438 | A | 10/1996 | Fontana et al. | 385/24 |
| 5,726,789 | A | 3/1998 | Horiuchi et al. | 398/191 |
| 5,946,117 | A | 8/1999 | Meli et al. | 359/124 |

FOREIGN PATENT DOCUMENTS

| EP | 0 573 913 | 12/1993 | |
|---|---|---|---|
| EP | 0 622 916 | 11/1994 | |
| EP | 0 690 534 | 1/1996 | |
| EP | 0 718 990 | 6/1996 | |
| WO | WO 96/16345 | 5/1996 | |
| WO | WO 96/27956 | 9/1996 | ......... H04B/10/158 |

OTHER PUBLICATIONS

J.J. Veselka et al., "Pulse Generation for Soliton Systems Using Lithium Niobate Modulators", IEEE Journal of Selected Topics in Quantum Electronics, vol. 2, pp. 300–310, 1996.

(Continued)

Primary Examiner—M. R. Sedighian
Assistant Examiner—Christina Y. Leung
(74) Attorney, Agent, or Firm—Baker Botts L.L.P.

(57) ABSTRACT

Soliton or soliton-like optical pulses with characteristics adapted to propagation in an optical line for RZ type transmission are generated by modulating a continuous optical signal (1) by means of a modulator (2) which is substantially devoid of chirping, in which the modulator drive signal comprises at least one frequency (4) and one harmonic (5) thereof superimposed on each other (7).

A high-speed optical transmission system is rendered independent of the type of transmitter or of signals sent to it if it comprises an adaptation unit (32) receiving the original optical pulses (30) and capable of generating corresponding pulsed signals (63) of RZ type.

20 Claims, 8 Drawing Sheets

OTHER PUBLICATIONS

D. Le Guen et al., "200Gbit/s 100 km–Span Soliton WDM Transmission Over 1000 km of Standard Fiber with Dispersion Compensation and Pre–Chirping", OFC, pp. PD7(1–3), 1997.

F.M. Knox et al., Soliton Transmission at 10 Gbit/s Over 2022 km of Standard Fibre with Dispersion Compensation, 22nd European Conference on Optical Communication, pp. 3.101–3.104, 1996.

Govind P. Agrawal, "Nonlinear Fiber Optics", Academic Press, 2nd Edition, pp. 170–172, 1995.

M.J. O Mahony, "Non–Linear Optical Transmission Systems", European Transactions on Telecommunications and Related Technologies, vol. 4, No. 6, pp. 629–640, 1993.

N.M. Froberg et al., "Pulse Generation by Harmonic Modulation of an Integrated DBR Laser–Modulator", Electronics Letters, vol. 30, No. 8, pp. 650–651, 1994.

L.F. Mollenauer et al., "Demonstration, Using Sliding–Frequency Guiding Filters of Error–Free Soliton Transmission Over More Than 20 Mm at 10 Gbit/s, Single Channel, and Over More Than 13 Mm at 20 Gbit/s in a Two–Channel WDM", Electronic Letters, vol. 29, No. 10, pp. 910–911, 1993.

* cited by examiner

SYSTEM AND METHOD OF HIGH-SPEED TRANSMISSION AND APPROPRIATE TRANSMISSION APPARATUS

CROSS REFERENCE TO RELATED APPLICATIONS

This application is a continuation of U.S. application Ser. No. 09/497,694 filed Feb. 3, 2000 and entitled "System and Method of High-Speed Transmission and Appropriate Transmission Apparatus" which is a continuation of International Application No. PCT/EP98/04782, filed Jul. 31, 1998, the content of which is incorporated herein by reference. This application claims the benefit of Provisional application Ser. No. 60/054,945 filed Aug. 7, 1997.

BACKGROUND OF THE INVENTION

In the field of digital type fibre-optic telecommunications, in addition to the possibility of using techniques of a conventional type (usually referred to as "Non-Return-to-Zero", or NRZ, in which essentially a 1 or 0 value is transmitted for the whole period corresponding to the speed of encoding adopted), the possibility exists of utilizing a transmission technology of the pulsed type, for example of the "soliton" or "soliton-like" type (usually referred to as "Return-to-Zero", or RZ), in which essentially a sequence of pulses is transmitted, each lasting less than the period corresponding to the speed of encoding adopted, and modulated on the basis of the digital information to be transmitted.

Among the techniques used for this purpose are known, for example, mode-locking fibre lasers and electroabsorption modulators, as well as other techniques.

A characteristic common to the aforesaid techniques consists of the fact that they are efficient for generating particularly short pulses suitable for transmission over dispersion-shifted or DS fibres, i.e. fibres with chromatic dispersion which approaches zero within the wavelength band employed for telecommunications, round about 1550 nm, as for example defined by the ITU-T Recommendation G653 1993, and for time-division optical multiplexing.

In the case of transmission over so-called step-index fibres, or SI fibres, (as for example described in ITU-T Recommendations G650 1993 and G652 1993) and with dispersion compensation, it is useful to have available fairly long pulses (for example lasting from 20 to 60 ps for a transmission frequency of 10 Gbit/s) while it is observed that with shorter-lasting pulses in the said SI fibre systems, with high dispersion, phenomena of dispersive wave generation are observed leading, ultimately, to an increase in the error rate of the transmission (BER).

Electroabsorption modulators, moreover, are intrinsically prone to generate pulses affected by "chirp".

The term "chirp" is understood to mean a variation in the frequency of the signal during its amplitude modulation, so that there is a (central) frequency of the signal which is different at the start of the pulse from the (central) frequency of the signal at the end of the said pulse.

The Patent WO 9616345 describes apparatus which uses two amplitude modulators controlled by two phase-locked modulating voltages, one having double the frequency of the other, in which the larger is the speed of pulse petition.

The article from the IEEE Journal of Selected Topics in Quantum Electronics, Vol. 2, No. 2, Jun. 1996 (Veselka et al.) describes an apparatus which comprises several sinusoidally driven intensity modulators linked in series for forming pulses.

The Patent EP 622916 describes a soliton generator which comprises a phase modulator and an amplitude modulator, respectively driven at the frequency of pulse repetition and at a harmonically correlated lower frequency.

The Patent EP 718990 describes a device for converting a data stream of the NRZ type into an RZ stream, which employs a modulator with Mach-Zehnder interferometer or a directional coupler.

The Patent U.S. Pat. No. 5,157,744 describes a soliton generator which comprises an amplitude modulator with Mach-Zehnder interferometer with a multiple series of distributed electrodes, driven at harmonically correlated frequencies. The Patent states that the process of combining several high-frequency signals into a single signal involves large attenuations and requires amplification, and that the transmission and processing of the final signal, which is a composite of many high-frequency signals, is extremely difficult. Moreover, if the composite signal requires amplification, a very expensive amplifier is required, able to amplify many very high frequencies uniformly. The invention of U.S. Pat. No. 5,157,744 is aimed at a soliton generator which avoids these problems.

D. Le Guen et al., in OFC 97 PD17(1–3), describe an experiment on a WDM soliton system with 10 channels at 20 Gbit/s, with compensation for chromatic dispersion and pre-chirping, in which a 1000 kilometer line of step-index fibre with 100 kilometer stretches was simulated by means of a 102 kilometer recirculation ring. The transmission uses electroabsorption modulators to modulate the emission from the laser sources so as to generate 20 ps pulses, subsequently coded by a lithium niobate modulator.

F. M. Knox et al., in ECOC 96, WeC3.2, 3.101–3.104, describe an experiment in 10 Gbit/s soliton transmission, with compensation for chromatic dispersion, over more than 2022 kilometers of step-index fibre; the experiment employed $sech^2$ (t) pulses of around 20 ps at 2.5 GHz, generated by an active mode-locking erbium fibre ring and modulated with a pseudo-random bit sequence by a lithium niobate amplitude modulator and twice interleaved to give a data stream at 10 Gbit/s, and injected into a 33 kilometer recirculating ring with an appropriate module for compensating chromatic dispersion.

M. J. O'Mahony, in European Transactions on Telecommunications and Related Technologies, Vol. 4, No. 6, November–December 1993, pp. 629–640, presents and discusses the main design equations for a soliton system. A soliton transmission experiment over 3000 km of dispersion shifted fibre is also described. In the experiment, a train of soliton pulses with a FWHM duration of 35 ps is generated at a rate of 5 GHz by an InGaAsP electroabsorption modulator. A second electroabsorption modulator is used to impress 5 Gbit/s data on the pulse train. The technique of dispersion compensation in linear systems is disclosed as one of the possible alternatives to the technique of non-linear (soliton) transmission to overcome the limitation due to fibre dispersion for high bit rate operation over long distances (>1000 km).

EP 690534 discloses a semiconductor laser modulator used to simultaneously generate optical pulses and encode data, so as to output RZ soliton pulses suitable for transmission in long distance optical communications. One embodiment relates to a laser that is biased near threshold and is also directly encoded with digital data from a data source. A second embodiment relates to a laser modulator device. The laser is biased to output a CW laser beam which is then modulated by the modulator, controlled by an electrical pulse shaping circuit. A technique for adding further harmonics to the pulse shaping circuit is also disclosed, wherein a fundamental frequency sinusoidal signal is frequency doubled and the signal is combined with its second harmonic, to give a combined periodic analogue signal. A dual gate FET performs an AND operation of an input NRZ data stream and the combined periodic analogue signal, to produce a RZ-format signal corresponding to the NRZ data. The output of the FET is further amplified by an electronic amplifier before it is used to drive the modulator.

U.S. Pat. No. 5,504,609 discloses a remodulator for WDM optical communication systems. The remodulator includes an optoelectronic element for receiving an information bearing optical signal at a transmission wavelength and outputting a corresponding electrical signal. The remodulator further includes an optical carrier emitting element comprising a light source at a reception wavelength. It further includes an external modulator for directly imparting the information in the electrical signal on the optical carrier emitted by the light source.

SUMMARY OF THE INVENTION

According to one aspect of the present invention, it is found that, by applying to a modulator of an optical signal a drive signal consisting of a periodic signal at one frequency, combined with at least one harmonic of the said periodic signal, it is possible to generate pulses of an amplitude suitable for pulsed optical communication, of the soliton type or the like.

Within the scope of the present invention, it has been found that optical pulses, of the soliton or similar type, can be used in a line comprising high-dispersion fibre (for example the aforesaid SI fibres) and chromatic dispersion compensation means, in which there is a first stretch with high signal power, in which this signal propagates under self-phase modulation (SPM), essentially without undergoing the effects of chromatic dispersion; and a subsequent stretch, in which the signal propagates under linear conditions, allowing compensation of its chromatic dispersion with conventional means of compensation.

In this way, in the stretch in which, on account of the power of the signal, it would not be possible to compensate dispersion effects liable to cause non-linear phenomena such as to jeopardize the possibility of compensating for dispersion, such compensation is not required thanks to the use of pulses propagating under soliton conditions; on the other hand, in the stretch in which the power of the signal has dropped below the level such as to allow temporal reconfiguration of the pulses (or soliton "reshaping"), compensation for dispersion may take place:

The term self-phase modulation is understood to mean a combination of non-linear effects associated with the propagation of a signal of intensity greater than a certain value under guided conditions in a dispersive optical conductor means, such that the chromatic dispersion of the means is essentially compensated and the temporal profile of any given pulse stays unaltered.

In the case of the fibre propagation of signal of given power P, the signal intensity is $I=P/A_f$, Where $A_f$ is the area of the cross-section associated with the propagation of the signal in the fibre.

According to the present invention it has been found that optical pulses with characteristics suitable for propagation in an optical line for RZ type transmission were able to be generated by modulating a continuous optical signal by means of a modulator essentially devoid of chirping, provided that the modulator drive signal comprises at least one frequency and one harmonic thereof superimposed on one another.

According to the present invention it has moreover been found that a high-speed optical transmission system can be rendered independent of the type of transmitter or of signals sent to it if it comprises an adaptation unit receiving the original optical pulses and capable of generating corresponding pulsed signals of the RZ type.

In particular, in a first aspect, the present invention relates to a pulsed transmission system, comprising at least one transmission station for transmitting an optical signal at a transmission wavelength, at least one reception station, a fibre-optic line linking said at least one transmission station and said at least one reception station and at least one optical amplifier serially linked along said fibre-optic line, wherein said fibre-optic line has a positive overall chromatic dispersion at said transmission wavelength and comprises:

a first optical conductor element, having a first chromatic dispersion at said transmission wavelength, and a chromatic dispersion compensating unit, having a second chromatic dispersion at said transmission wavelength, said second chromatic dispersion being of opposite sign with respect to said first chromatic dispersion, wherein said at least one transmission station comprises a high speed optical pulse transmitter adapted to generate a RZ optical signal at said transmission wavelength, bearing a coded information at a preset frequency, said RZ optical signal comprising optical pulses of duration $T_{FWHM}$ wherein:

the ratio $T_{bit}/T_{FWHM}$, between the inverse $T_{bit}$ of said preset frequency and said duration $T_{FWHM}$ of the pulses, is higher than 200/75 and lower than 10, and said optical pulses are substantially free from chirp.

Preferably, said transmission station comprises at least an interfacing unit adapted to receive a first optical signal at said preset frequency bearing said coded information, said at least an interfacing unit including a receiving and converting unit adapted to receive said first information-bearing optical signal, to convert it into an electrical signal bearing said coded information, and to feed said information bearing electrical signal to said high speed optical pulse transmitter.

Preferably said high speed optical pulse transmitter comprises:

an optical pulse modulator, adapted to modulate an optical signal with a sequence of periodic pulses having said duration TFWHM and said preset frequency;

an optical signal modulator, optically linked to said signal modulator, adapted to modulate said optical signal with said coded information; and a generator of a continuous optical signal at said transmission wavelength, optically linked to said pulse and signal modulators.

Said chromatic dispersion compensating unit can comprise a second optical conductor element serially linked to said first optical conductor element.

In an embodiment, said optical signal at said transmission wavelength has, for at least one portion of its propagation path in one of said first and second optical conductor elements, an intensity of a value such as to cause self phase modulation of said second optical signal.

According to another embodiment, said optical amplifier has amplification characteristics such that said optical signal at said transmission wavelength has, in at least one portion of its propagation path in one of said first and second optical conductor elements, an intensity of a value such as to undergo self phase modulation.

In an embodiment, said first optical conductor element is a step-index optical fibre. In another embodiment, it is an optical fibre with non-zero dispersion.

Said chromatic dispersion compensation unit is preferably adapted to compensate a fraction of the chromatic dispersion of the line, such that the total chromatic dispersion of the line is between 100 and 120% of the compensated dispersion.

In a second aspect, the present invention relates to an optical pulse transmission method, comprising the steps of:

emitting an optical signal at a transmission wavelength and at a preset frequency bearing a coded information;

supplying the optical signal in an optical-fibre line having a chromatic dispersion;

compensating the chromatic dispersion of the signal in the optical-fibre line with a chromatic dispersion of opposite sign, so as to achieve an overall positive dispersion for the optical signal;

wherein said step of emitting comprises:

generating a sequence of substantially chirp-free optical pulses at the transmission wavelength having a duration $T_{FWHM}$, the ratio $T_{bit}/T_{FWHM}$, between the inverse $T_{bit}$ of said preset frequency and said duration $T_{FWHM}$ of the pulses, being higher than 200/75 and lower than 10;

modulating said sequence of optical pulses with said coded information.

Advantageously, said step of generating said sequence of pulses comprises combining a first periodic electrical signal at said preset frequency and at least one second periodic electrical signal at a second frequency which is a harmonic of said preset frequency.

In a third aspect, the present invention relates to a high-speed optical pulse transmitter, comprising:

an optical signal modulator;

an optical pulse modulator, optically linked to said signal modulator;

a generator of a continuous optical signal, optically linked to said signal and pulse modulators;

a signal modulator driver for feeding said signal modulator with an electrical signal bearing a coded information with a first frequency; and a pulse modulator driver comprising a circuit for generating a first periodic electrical signal at said first frequency;

wherein said pulse modulator driver further comprises:

a circuit for generating a second periodic electrical signal at a second frequency which is a harmonic of said first frequency;

a first and a second amplifier for amplifying said first and second periodic electrical signal; and a combining element for combining said amplified first and second periodic electrical signals, and for feeding said pulse modulator with said combined signal.

Preferably, said circuit for generating said first periodic electrical signal at said first frequency is driven by a clock signal associated with said information-bearing electrical signal.

Preferably said circuit for generating said second periodic electrical signal comprises a frequency multiplier, linked to said circuit for generating said first periodic electrical signal.

Preferably said circuit for generating said first periodic electrical signal comprises an output for a synchronization signal, said synchronization signal being in a preset time relationship with said clock signal, said output being linked to said signal modulator driver.

Advantageously, said combining element is a distributed-constants circuit.

The present invention also relates to a pulsed transmission system, comprising at least one transmission station for transmitting an optical signal, one reception station, one fibre-optic line linking said transmission station and said reception station and at least one optical amplifier serially linked along said fibre-optic line, characterized in that said transmission station comprises a high speed optical pulse transmitter according to the above indicated third aspect of the invention.

Advantageously, said fibre-optic line has overall chromatic dispersion greater than zero at the wavelength of said optical signal.

Preferably, said fibre-optic line comprises chromatic dispersion compensation means adapted to compensate a fraction of the chromatic dispersion of the line and such that the total chromatic dispersion of the line is between 100 and 120% of the compensated dispersion.

More preferably, said transmission station comprises:

a plurality of high speed optical pulse transmitters, each comprising a respective generator of a continuous optical signal at a respective wavelength, different from that of the other units, each transmitter being able to generate an appropriate pulsed optical signal at a respective wavelength; and a multiplexer for combining said pulsed optical signals.

Even more preferably, said reception station comprises a wavelength demultiplexer for separating said pulsed optical signals.

In a still further aspect, the present invention relates to a method of high-speed optical transmission, comprising the steps of:

generating an optical signal;

modulating said optical signal with a periodic drive signal;

modulating said optical signal with an information bearing, signal at a preset frequency.

The invention method further comprises the step of generating said periodic drive signal by combining an amplified periodic signal at said preset frequency and at least an amplified periodic signal at a harmonic of said preset frequency.

BRIEF DESCRIPTION OF THE DRAWINGS

More details may be gleaned from the following description, with reference to the appended figures, in which are shown.

DETAILED DESCRIPTION OF THE INVENTION

Apparatus for generating pulses.

Figure 1:
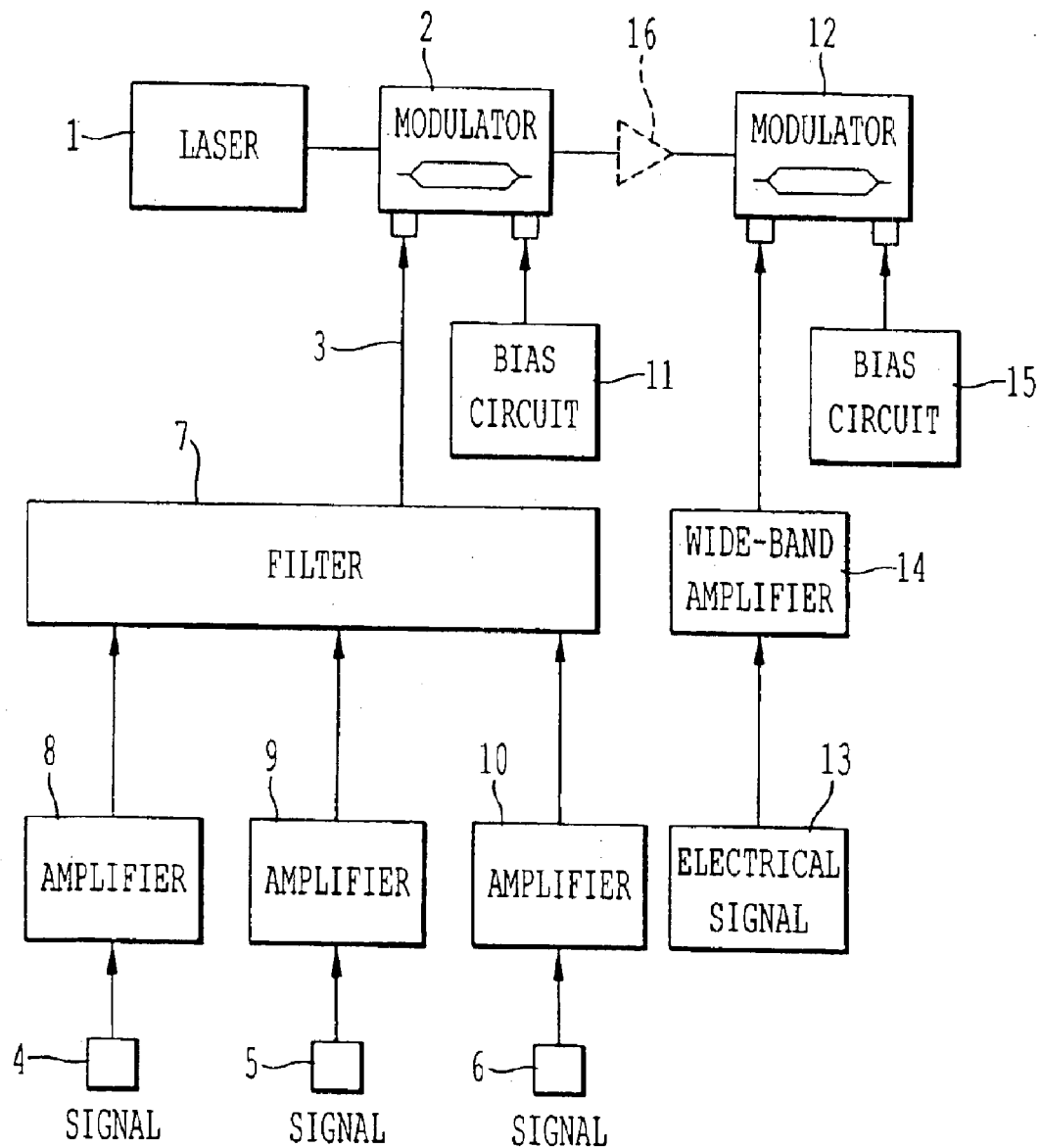
In FIG. 1 a general diagram of a generator device according to the present invention.

As shown in FIG. 1, a continuous-emission laser 1 is linked by a first amplitude modulator 2, hereafter referred to as pulse modulator for example of the Mach-Zehnder interferometer type, driven by a composite electrical signal 3, consisting of a first periodic electrical signal 4, preferably sinusoidal, with frequency $f_1$ equal to the desired transmission frequency (for example 10 GHz), by a second periodic electrical signal 5, also preferably sinusoidal, at a frequency consisting of the second harmonic $f_2$ of the signal 3 (for example 20 GHz) and, possibly, by one or more periodic electrical signals 6, also preferably sinusoidal, at frequencies consisting of higher harmonics $f_3, f_4, \ldots$ (30, 40, ... GHz) of the transmission frequency $f_1$.

For the purposes of the present description, the term second harmonic of a signal of given frequency is understood to mean a signal with double the frequency of the said given frequency, the said fundamental frequency; the terms third harmonic, fourth harmonic, etc. are understood to mean signals at frequencies respectively triple, quadruple etc. the said given fundamental frequency.

For the purposes of the present invention, the term frequency of a periodic signal is understood to mean the frequency of the sinusoid, in the case in which the periodic signal is a sinusoidal signal, or else the frequency of the fundamental sinusoid in the Fourier series expansion of the signal, in the case in which it has a non-sinusoidal temporal profile, and the term higher harmonics is understood to mean whole multiple frequencies of the said sinusoid or of the said fundamental frequency.

Hereafter, unless otherwise specified, the terms "sinusoidal signal" and "harmonic of the frequency of the sinusoidal signal" are used to mean that these comprise either signals with sinusoidal time profile and appropriate harmonics or signals with a different time profile, for example with a triangular, square or similar wave, or else with a more complex profile, for example with a $sech^2$ (t) profile, (typical of soliton pulses), and signals at harmonic frequencies of the fundamental frequency of the said signals, having the same or a different time profile.

Electrical signals with sinusoidal profile are preferred and can beneficially be generated with known electronic devices, as described hereafter.

Such electrical signals with different frequencies are combined together by means of a combining filter 7 (described hereafter) possibly after amplification by respective amplifiers 8, 9, 10.

The amplifiers 8, 9, 10 are beneficially narrow-band amplifiers (one for each harmonic), which are very simple to produce and inexpensive (compared with wide-band amplifiers which would be needed to amplify a multifrequency signal such as that at the output of the combining filter 7); this is possible in the case in which the amplification is performed before the combining filter.

The pulse modulator 2 moreover receives, beneficially, an electrical bias signal generated by a bias circuit 11.

The pulse modulator 2 emits a pulsed modulated optical signal which is supplied to a second amplitude modulator 12 (also for example of the Mach-Zehnder interferometer type), referred to hereafter as the signal modulator, driven by an electrical signal 13 containing the data to be transmitted, possibly amplified by a wide-band amplifier 14.

The signal modulator 11 moreover receives, beneficially, an electrical bias signal generated by a bias circuit 15.

It is also possible to exchange the order of the modulators 2 and 12, placing the signal modulator, modulated with the data 12, before the pulse modulator 2, modulated with the sinusoids 4, 5, 6.

It is also possible to integrate both modulators 2 and 12, the pulse and signal modulators respectively, for example on the same $LiNbO_3$ "chip", obtaining an advantage in terms of the output power of the device.

Alternatively, moreover, as illustrated with dashed lines in FIG. 1, it is also possible to interpose an optical amplification stage 16 between the two modulators, should the optical losses from the assembly be too high. The modulator 2 can, where beneficial, adopt a (narrow-band) resonating-electrode structure.

Although the use has been described of Mach-Zehnder interferometer modulators, preferably made of $LiNbO_3$, it is possible to apply the present invention to various types of modulating means, for example, other than $LiNbO_3$ modulators, as well as electroabsorption modulators, those made of fibre subjected to "poling", those made of organic optical crystals or polymers, and similar devices, which are able to apply amplitude modulation to an optical signal and are driven by a preset input signal.

The signals 4, 5, 6 are in a preset phase and amplitude relation.

In particular, in the case of two frequencies, respectively denoted $f_o$ and $2f_o$ (higher harmonic), the resulting frequency is given by:

$$f_1 = A_1 \sin(2\pi f_0) + A_2 \sin(4\pi f_0 + \alpha);$$

in which $A_1$ and $A_2$ are the respective amplitudes of the two frequencies $f_0$ and $2f_0$ used and $\alpha$ is the relevant phase difference.

Figure 3A:
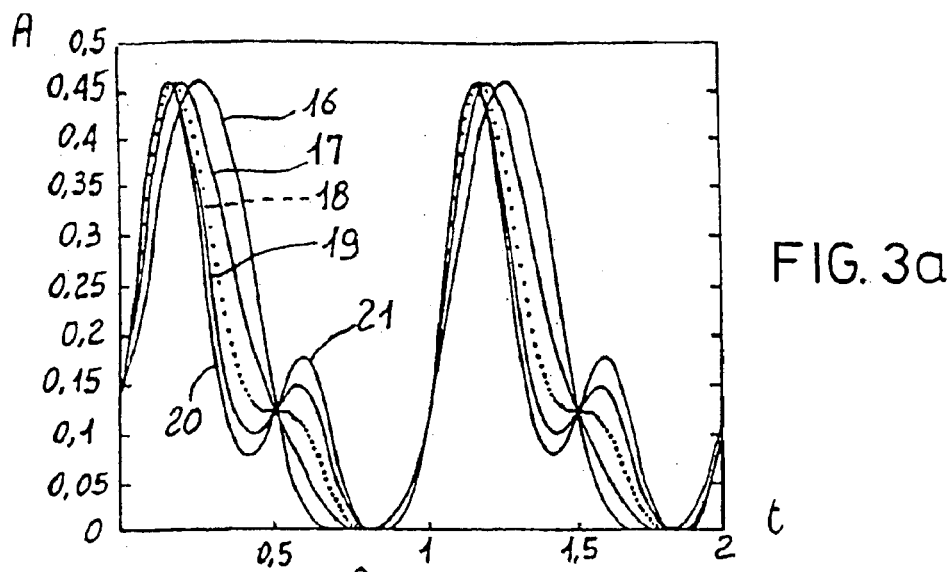
In FIGS. 3a, 3b, 3c respectively the time graphs (in arbitrary units) of the amplitude of the optical pulses obtained in the presence of a main frequency and its first harmonic, under various conditions of phase-shift and amplitude ratio.
Figure 3B:
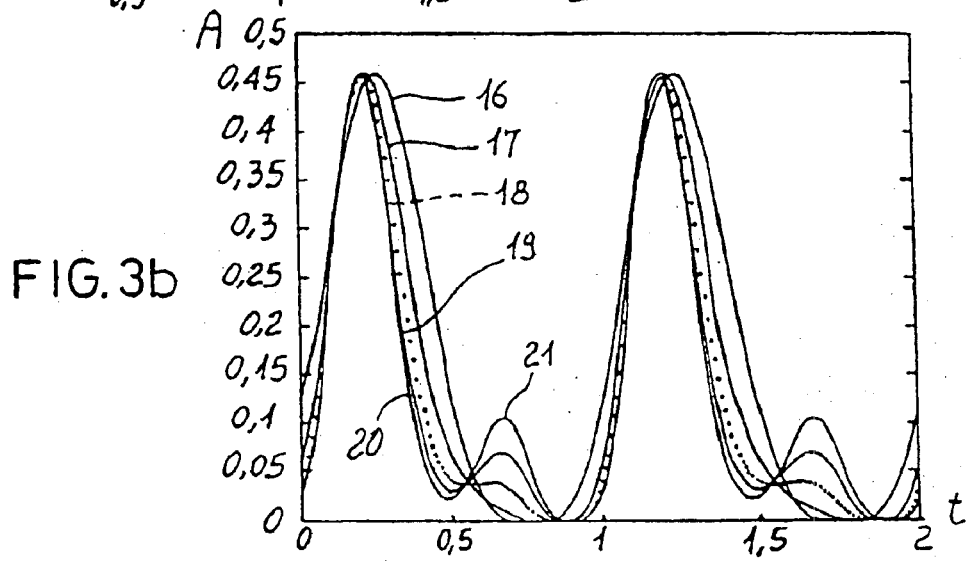
Figure 3C:
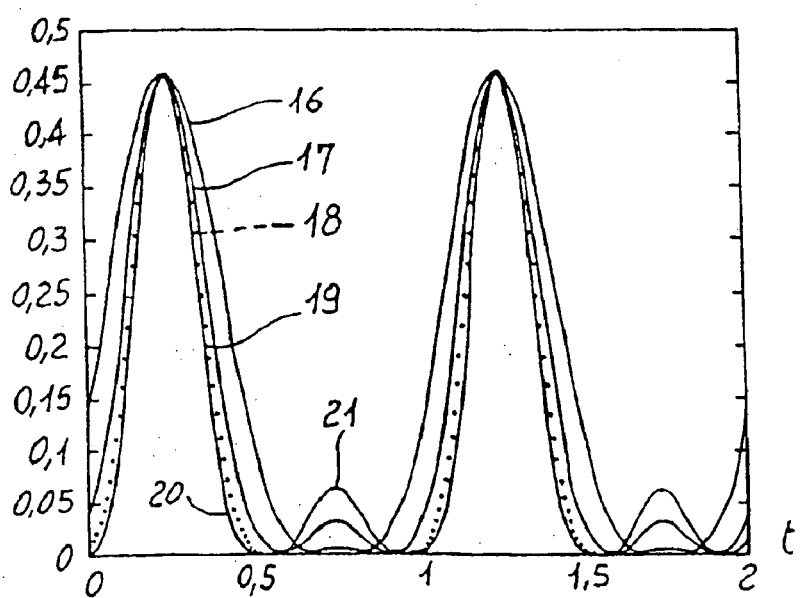

Under this condition, under the assumption of an ideal frequency response of an electro-optical modulator, as shown in FIGS. 3a, 3b, 3c, respectively representing the pulse train output by the modulator for three different phase relations (corresponding to values of $\alpha$ equal to 0 (FIG. 3a), $\pi/4$ (FIG. 3b), $\pi/2$ (FIG. 3c)) pulses of gradually smaller width may be obtained by increasing the ratio $A_2/A_1$, as indicated by the corresponding curves 16, 17, 18, 19, 20 relating respectively to $A_2/A_1=0$ (no second harmonic); $A_2/A_1=0.25$; $A_2/A_1=0.5$; $A_2/A_1=0.75$; $A_2/A_1=1$.

A limit to the increase in the ratio $A_2/A_1$ is provided by the growth of a secondary peak 21, at double the frequency of the fundamental frequency applied; for example, under the conditions adopted, it is observed that this peak is of negligible amplitude for a ratio $A_2/A_1$ of between 0.25 and 0.5, (curves 17, 18) with which a pulse amplitude is obtained which is already satisfactorily reduced as compared with the presence of the fundamental frequency alone.

It is known that the said secondary peak, if its value is too high, could be detected as a 1 value in the digital transmission, even if the corresponding main peak has been deleted following the prescribed modulation.

In general, in an actual system, the relationship between the amplitudes and the phase is influenced by the response characteristics of the modulators employed and should be defined from time to time, operationally, depending on the duration of the pulse which it is desired to obtain at the output of the device and the noise in the zero values at reception, by for example controlling the error rate (Bit Error Rate or BER) at reception as a function of the aforesaid parameters (relationship between amplitudes and phase), in such a way that it is below the desired value (for example at least less than $10^{-9}$).

Synchronization of the phase of all the signals can be achieved with microwave phase adjustors, for example as described hereafter.

The regular train of pulses at the fundamental frequency, this train being generated by the modulator 2, is supplied to the second modulator 12. This modulator, driven by an electrical signal containing the information to be transmitted, codes the information in the pulse train (digital optical system with external modulation).

The non-linear transfer characteristic of the modulator 2, in response to the sinusoidal signals at different frequencies supplied to it, is such that at the output of the system is obtained a continuous train of pulses of the RZ type, essentially unaffected by "chirp", and which are suitable for transmission under SPM at least in part of the line.

Figure 2:
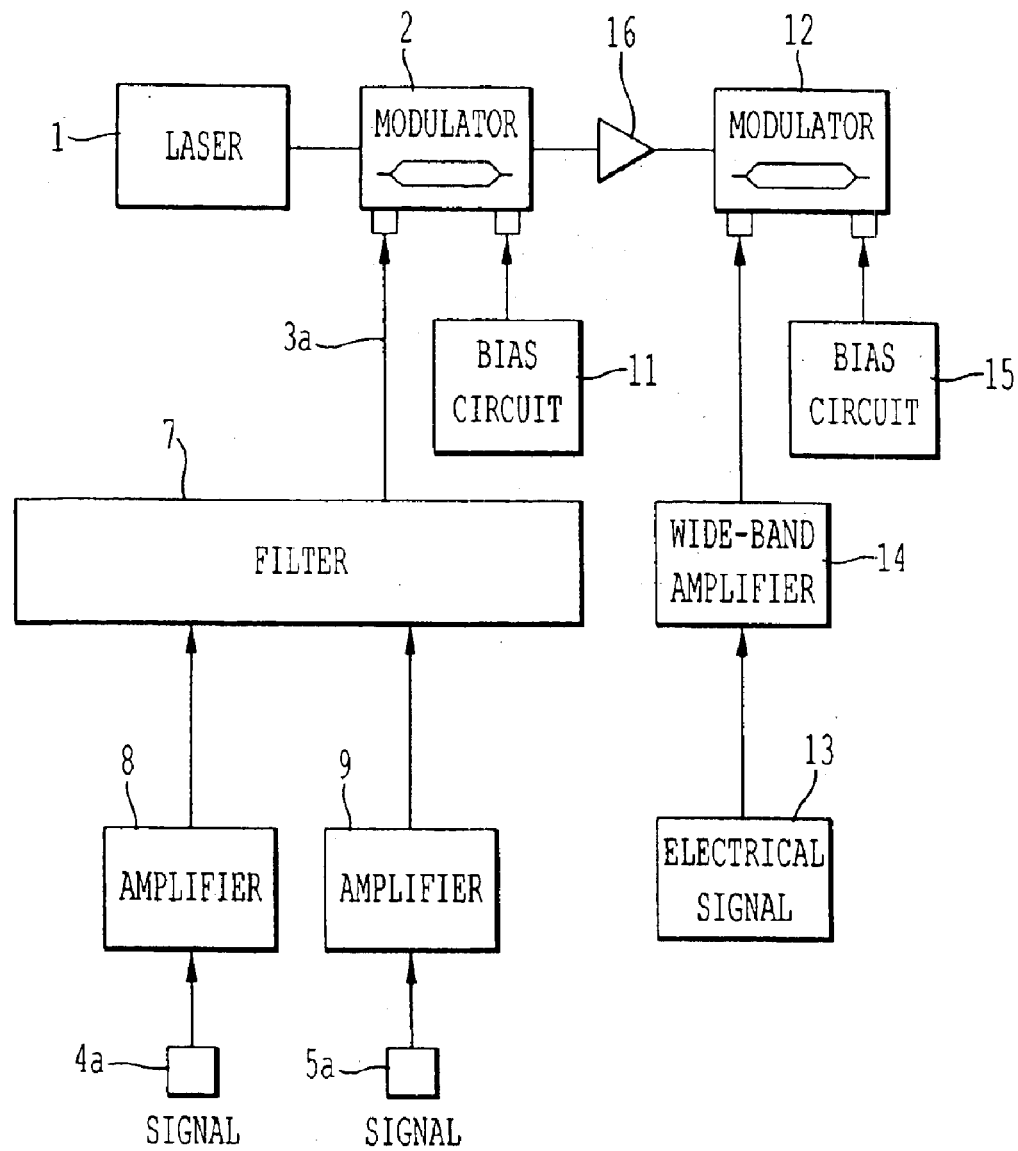
In FIG. 2 a diagram of a generator device according to the present invention, as embodied for experimental purposes.

One experiment utilized the apparatus represented FIG. 2, in which the corresponding components are labelled with the same numerical references as FIG. 1.

A DFB laser with output power of 10 mW and wavelength 1549 nm was used as continuous-wave laser 1. The pulse modulator 2 was modulated with a composite signal 3a, comprising the fundamental frequency 4a of 5 GHz, which was extracted from the system clock and suitably amplified with a microwave amplifier, and its second harmonic 5a at 10 GHz, obtained by multiplying the likewise amplified clock frequency by 2.

The combination, obtained by means of the combining filter 7, of the two frequencies 4a, 5a was then sent to the pulse modulator 2.

Figure 5A:
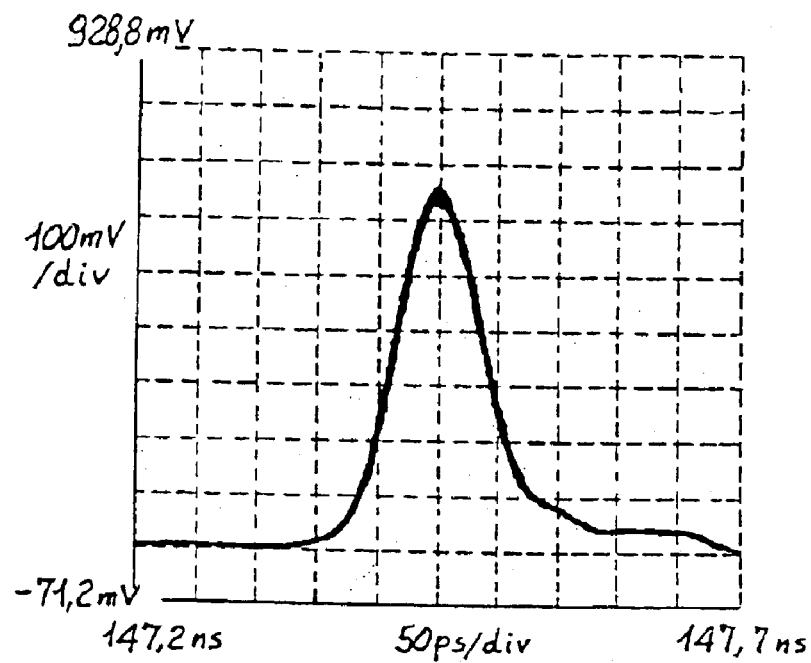
In FIG. 5A the time graph of the pulses output by the first modulator of the device of FIG. 2, in the presence of the fundamental frequency alone.
Figure 5B:
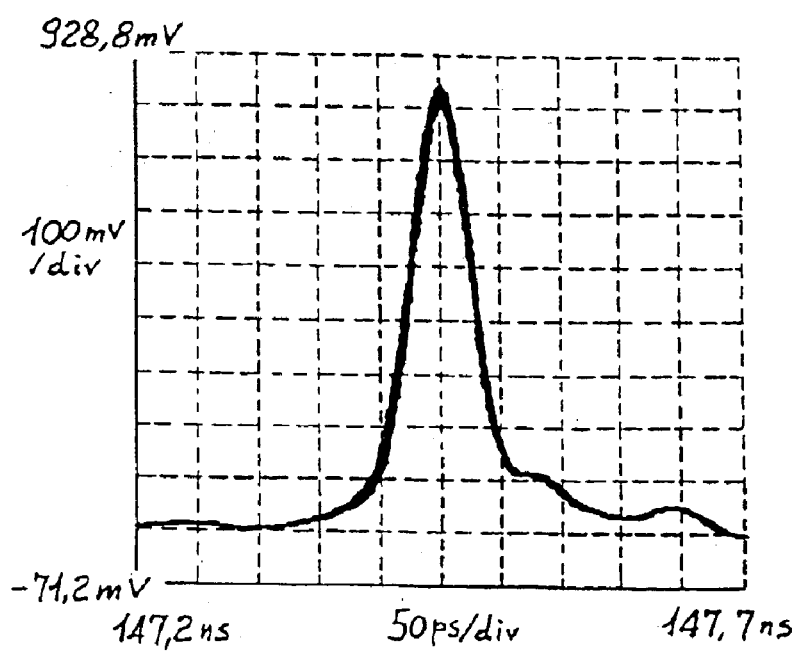
In FIG. 5b the time graph of the pulses output by the first modulator of the device of FIG. 2, in the presence of the fundamental frequency and its first harmonic.

The optical signal which was obtained at the output of the pulse modulator 2 (obtained with a sampling oscilloscope) is plotted in FIGS. 5a, 5b, respectively in the case in which the 5 GHz frequency alone was supplied and in the presence of the two frequencies at 5 and at 10 GHz combined.

For the purposes of the present description the term "duration" of a pulse is understood to mean its total duration at ½ height, known in the art as TFWHM (Full Width Half Maximum).

As is apparent from FIG. 5b, the measured duration of the resulting pulses in the presence of the two frequencies at 5 and at 10 GHz combined was around 50 ps; by suitably controlling the bias of the modulator 2 and the amplitudes and relative phases of the two signals at 5 and at 10 GHz it was moreover possible to vary the duration of the pulses in the range 50–100 ps.

This adjustment, moreover, made it possible moreover to optimize the time profile of the pulses, rendering it as symmetrical as possible (i.e. with equal slope for the rising edge and for the falling edge of the pulse).

With the 5 GHz frequency alone, however, it was possible to obtain a pulse train with a minimum duration of not less than 75 ps, which is much higher than that above.

The use of the two harmonic frequencies combined as input to the modulator thus makes it possible essentially to eliminate the restriction of the range of values obtainable, within the scope of values of duration which is of more interest in practical cases.

It is in fact useful, in RZ type transmissions, to use fairly short pulse durations as compared with the repetition period (in this case 200 ps).

Pulses of excessive duration (for example 75 ps or more), in fact, would be too close temporally and could interact with one another in the propagation along the line, giving rise to signal distortion stemming from the non linear effects associated with their propagation in the fibre.

The duration for which two consecutive pulses are apt to collide, after a certain distance travelled in-fibre depends on the time intervening between these same pulses, i.e. on the transmission frequency (or bit rate), as for example described by Govind P. Agrawal, in "Nonlinear Fiber Optics", Academic Press, 2nd edition, 1995, pp. 170–172.

Typically, for fibre runs of the order of a thousand kilometers, a ratio $T_{bit}/T_{FWHM}$ of greater than 6 and preferably greater than 8 is deemed to be acceptable. Preferably this ratio is less than 10.

The notation $T_{bit}$ is understood to mean the inverse of the transmission frequency, or "bit rate", adopted.

The extra degree of freedom made possible by introducing the second frequency renders the transmitter with the two frequencies very much more versatile than that with single frequency, and hence adaptable to the requirements of all systems of practical use.

The introduction of further harmonic frequencies, where beneficial, enables the system to be adapted moreover to particular specific requirements.

The pulse durations reported previously are the actual durations of the pulses, obtained by deconvolving the band effects of the instrument from the measurements.

The optical pulses generated by the pulse modulator 2 were then sent to the second modulator 12, or signal modulator, passing through the optical amplifier 16, in such a way as to compensate the losses introduced by the pulse modulator.

Figure 6:
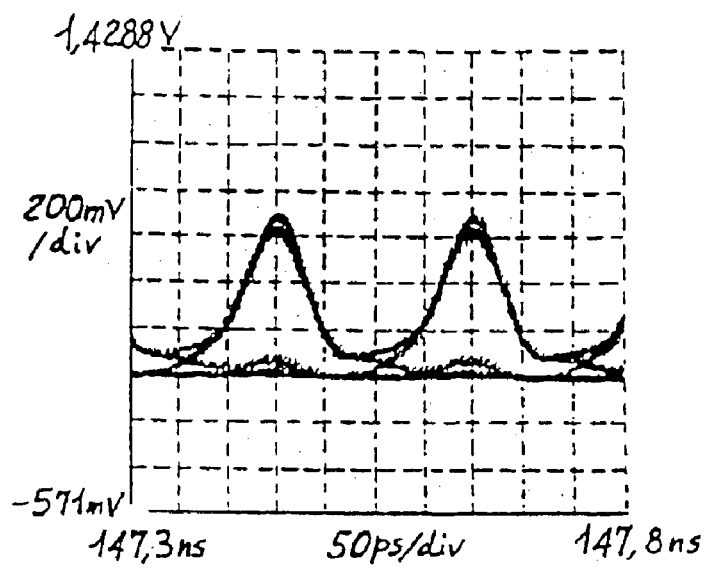
In FIG. 6 the eye diagram on output from the device of FIG. 2, in the presence of the fundamental frequency and its first harmonic, after the second modulation.

Then, the signal modulator 12 introduces the coding of the data at 5 Gbit/s, giving rise to the signal, represented in FIG. 6.

Beneficially the length of the electrical conductors linking together the electronic apparatuses and the modulators is sized so as to synchronize the pulse train generated by the first modulator with the electronic data signal which supplies the second modulator.

Beneficially the synchronization of all the signals may be obtained with microwave phase adjusters.

Combining filter.

Figure 4:
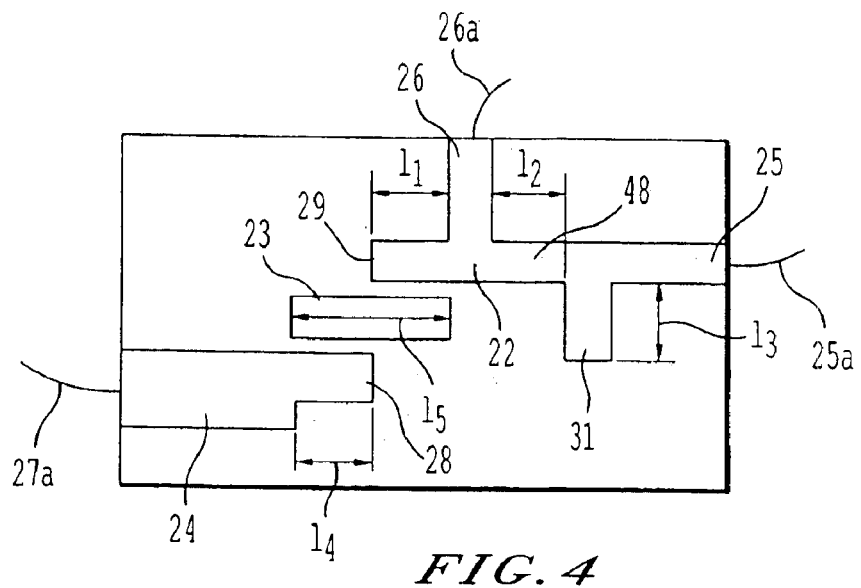
In FIG. 4 an example of a combining filter for high frequencies as embodied for the device of FIG. 2.

The combining filter 7, represented in FIG. 4, consists of a microstrip or distributed-constants circuit, consisting of a substrate 21 a made of insulating material, preferably ceramic, on which are produced several conductive tracks or strips 22, 23, 24.

The strip 22 has two ends, 25, 26, respectively linked to an input conductor 25a, bearing a signal input at the main frequency (5 GHz in the example) and to an output conductor 26a, bearing the composite output signal consisting of the main frequency and its second harmonic. The signal at the frequency of the second harmonic of the main frequency (10 GHz in the example) is supplied by a second input conductor 27a linked to the strip 24.

As shown in the Figure, the strips 22, 23, 24 have portions with respective lengths is, $l_1$, $l_2$, $l_3$, $l_4$, $l_5$, which depend on the wavelength of the signals; in particular, in the example illustrated $l_1$, $l_2$, $l_3$, $l_4$, are identical and equal to $\lambda/4$ and $l_5$ is equal to $\lambda/2$, where $\lambda$ is the wavelength of the signal at 10 GHz.

In particular, a filter centred at 10 GHz (made up by the portion 28 of the strip 24, by the strip 23 and by the portion 29 of the strip 22, having respective lengths $\lambda/4$, $\lambda/2$, $\lambda/4$) has been placed on the 10 GHz input arm 24, so as to prevent passage of the 5 GHz frequency to the 10 GHz input 27a.

Furthermore, in respect of the 5 GHz input, the 10 GHz frequency sees an open circuit (made up by three stretches 29, 30, 31 of length λ/4). Thus the 10 GHz frequency is conveyed entirely to the output 26. Adaptation to the output has been obtained on the 5 GHz input arm 25 (by means of a filter which blocks the 5 GHz frequency and by means of the three stretches 29, 30, 31 of length λ/4): therefore, the 5 GHz frequency is also conveyed entirely to the output 26. The loss introduced by the device has been be around 0.5 dB for each frequency.

The signal thus obtained is forwarded shown to the modulator 2.

The Applicant has observed that, whereas if a microwave coupler is used for combining the frequencies, at least 6 dB are lost, the use of a device (such as the combining filter described in FIG. 4 by way of example) allows two or more different frequencies to be combined with negligible losses for each frequency, giving rise to a combination ideally having zero losses (apart from the excess losses, which may be of the order of 0.5 dB for each frequency).

Furthermore, according to the present invention, by virtue of the essential absence of losses in the combining operation, each frequency can be amplified separately ahead of the combiner, thus using narrow-band amplifiers which are inexpensive and easy to produce.

Transmission System

Figure 7:
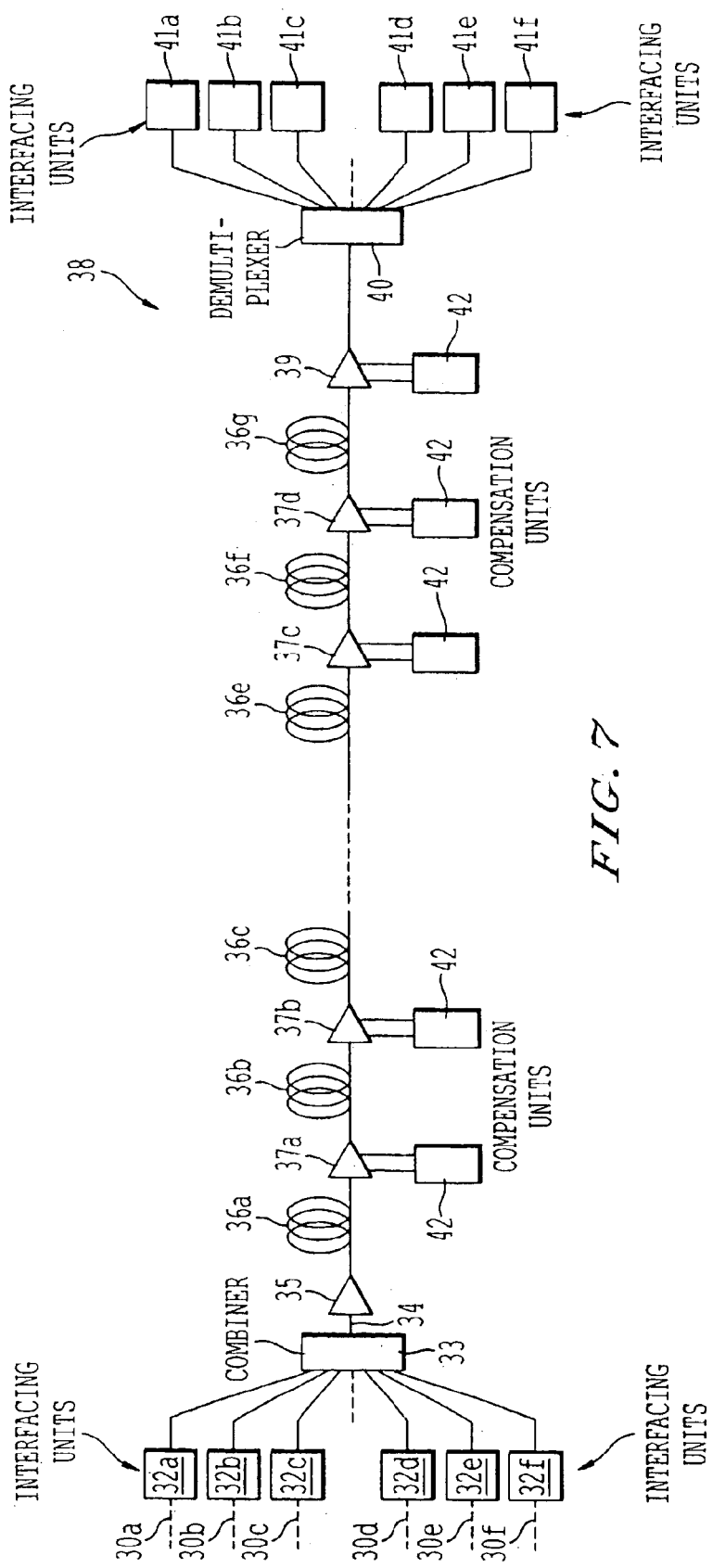
In FIG. 7 a general diagram of a high-speed transmission system according to the present invention.

As shown in FIG. 7, a high-speed optical telecommunication system, with wavelength multiplexing, according to an example embodiment of the present invention receives several initial optical signals 30a, 30b, 30c, 30d, 30e, 30f etc. (for example 16), each of which signals, referred to as the "external signals", possesses its own transmission characteristics, in particular wavelength, power, type of modulation and transmission frequency (bit rate), for example 10 Gbit/s.

The signals, generated by local external sources or originating from further portions of optical network, are each supplied to a respective interfacing unit 32a, 32b, 32c, 32d, 32e, 32f, etc., able to receive the initial external optical signals, detect them and reproduce them anew with characteristics matched to the high-speed transmission system.

In particular, the said interfacing units generate respective optical work signals having wave-lengths $\lambda_1, \lambda_2, \lambda_3, \lambda_4, \lambda_5, \lambda_6$, and so on, included within the useful working band of the amplifiers arranged subsequently in the system, having, in addition, RZ pulsed modulation characteristics.

In the Patent U.S. Pat. No. 5,267,073, from the same Applicant, the description of which is incorporated for reference, interfacing units are described which comprise in particular a transmission adaptor, able to convert an optical signal input into a form matched to the optical transmission line, and a reception adaptor, able to reconvert the transmitted signal into a form matched to a reception unit.

In the case in which the signals of the various channels to be transmitted are signals of electrical rather than optical type, they are each supplied directly to a respective transmission unit, at the appropriate wavelength, incorporating the pulse generation apparatus described previously.

The optical work signals generated by the interfacing units 32 or generated directly at the envisaged wavelengths, are then supplied to a signal combiner 33 able simultaneously to send down a single optical output fibre 34 the work signals at the wavelengths $\lambda_1, \lambda_2, \lambda_3, \lambda_4, \lambda_5, \lambda_6$, etc.

In general, the signal combiner 33 is a passive optical device by means of which the optical signals transmitted over respective optical fibres are superimposed in a single fibre; devices of this kind consist for example of fusible-fibre couplers, made in planar optics, microoptics and the like.

By way of example, combiners of this kind are sold by E-TEK Dynamics Inc., 1885 Lundy Ave., San Jose, Calif. (USA).

Via the fibre 34 the said work signals are sent to a power amplifier 35, which raises their level to a value sufficient to traverse a subsequent stretch of intervening optical fibre ahead of fresh means of amplification retaining at the end a power level which is sufficient to guarantee the required transmissive quality.

A first stretch 36a of optical line, preferably consisting of a single-mode optical fibre inserted into a suitable optical cable, is then linked to the power amplifier 35; typically, for the transmission characteristics of the system according to the present invention, the line is of the order of around 100 kilometers long (for example 80–120 kilometers with the power levels indicated below and the dispersion compensation devices described).

At the end of the said first stretch 36a of optical line is a first line amplifier 37a, able to receive the signals, attenuated in their journey down the fibre, and to amplify them up to a level sufficient to supply them to a second stretch of fibre-optic line 36b, with similar characteristics to those of the previous line.

Subsequent line amplifiers 37b, 37c, 37d and so on, and respective stretches of optical fibre 36c, 36d, 36e, 36f, 36g and so on span the required overall transmission distance, reaching a reception station 38, which comprises a preamplifier 39, able to receive the signals and amplify them, compensating for the loss given by the subsequent demultiplexing equipment, up to a power level matched to the sensitivity of the reception devices.

Typically, in a preferred embodiment of the present system, the overall distance of the link between a transmission station, housing the interface units, and the reception station, may be of the order of around 1000–2000 kilometers, preferably about 1000 kilometers (having regard to the required safety margins). In a preferred embodiment, the single-mode optical fibres employed in the various stretches 36 described above are of the step-index type, with which satisfactory transmission at 10 Gbit/s is obtained over the aforesaid distance of around 1000–2000 kilometers.

Although step-index fibres are preferred for the purposes of the present invention, in relation to specific requirements, such as for example for systems with large distances, or higher values of encoding frequency (for example 40 Gbit/s), it is possible to employ fibres with a lower value of chromatic dispersion, for example fibres with non-zero dispersion, described in ITU-T Recommendation G655 1997, or else of the dispersion shifted type, described in the already cited ITU-T Recommendation G653 1993 (for example in the case in which the Four Wave Mixing phenomena are not critical), or combinations of fibres with different values of dispersion, provided that overall the propagation of soliton or soliton-like pulses is made possible.

From the preamplifier 39 the signals are sent to a demultiplexer 40, by which the same signals are separated depending on their relative wavelengths, and then sent to respective reception or interfacing units 41a, 41b, 41c, 41d, 41e, 41f, etc., which are able to receive the optical signals and use them as such, or else, if required, to regenerate them with the optical characteristics matched to the subsequent equipment envisaged (not represented).

The demultiplexer 40 can be produced by multifold technologies, for example employing signal dividers in association with Bragg grating filters, interference filters or combinations thereof, or else arrayed grating devices (Arrayed Waveguide Gratings, or AWGs), or the like.

The configuration described lends itself in a particularly satisfactory manner to transmissions over distances of the order of around 1000 km, with high transmission speed, for example 10 Gbit/s (achieving with sixteen channels at different multiplexed wavelengths an overall transmission capacity of 160 Gbit/s).

For the purposes of the present invention and for the use described above, the power amplifier 35 is, preferably, an erbium-doped-fibre optical amplifier, with one or more stages; in the system illustrated, in the presence of 16 wavelength-multiplexed channels, the power amplifier 35 typically has the following characteristics:

| Input power | from | −5 to +2 dBm |
|---|---|---|
| Output power | | +20 dBm |
| Working wavelength | | 1530–1560 nm. |

Amplifiers of this type are for example sold by the Applicant.

The term power amplifier is understood to mean an amplifier operating under conditions of saturation, in which the power output depends on the pumping power, as described in detail in European Patent No. EP 439,867 incorporated herein for reference.

For the purposes of the present invention and for the use described above, the preamplifier 39 is, preferably, an erbium-doped-fibre optical amplifier, with one or more stages; in the system illustrated, in the presence of 16 wavelength-multiplexed channels, the preamplifier 39 typically has the following characteristics:

| Input power | from | −5 to +2 dBm |
|---|---|---|
| Output power | from | +7 to +10 dBm |
| Working wavelength | from | 1530–1560 nm. |

For the purposes of the present invention and for the use described above, the term preamplifier is understood to mean an amplifier placed at the end of the line, capable of raising the signal to be supplied to the receiver to a value suitably above the sensitivity threshold of this receiver (for example from −26 to −11 dBm on input to the receiver), while at the same time introducing the least possible noise and retaining the equalization of the signals.

Suitable preamplifiers are sold by the applicant.

The line amplifiers are, preferably, erbium-doped-fibre optical amplifiers, preferably with several stages, able to output an overall power of at least 20 dBm and to operate with a working wavelength of 1530–1560 nm.

Beneficially, at least one of the line amplifiers 37 and/or the preamplifier 39 are associated with a respective chromatic dispersion compensation unit 42, able to compensate at least part of the chromatic dispersion of the line or of a stretch of line relative thereto.

Preferably, all the line amplifiers 37 and the preamplifier 39 are associated with a chromatic dispersion compensation unit 42.

Alternatively, it is possible to insert chromatic dispersion compensation units every 200–500 kilometers (for example every 2 or more amplifiers), or even to insert one or more dispersion compensation units at the beginning or at the end of the entire link.

This choice is tied, among other factors, to the overall length of the line: for example, for a line with overall length of about 1000 kilometers it is possible to install a compensation unit every 100–200 kilometers roughly, whereas for lines of lesser overall length, for example 300–400 kilometers roughly, a single compensation unit can be installed.

An illustrative embodiment of a transmission system according to the invention, over a distance of around 1000 km, comprising 10 stretches of step-index SI optical fibre of around 100 kilometers each, allows a maximum overall chromatic dispersion of around 18000 ps/nm and a minimum overall chromatic dispersion of around 15500 ps/nm (essentially dependent on the characteristics of the SI fibres employed), of which at least 15500 ps/nm is compensated by the chromatic dispersion compensation units 42.

Figure 8:
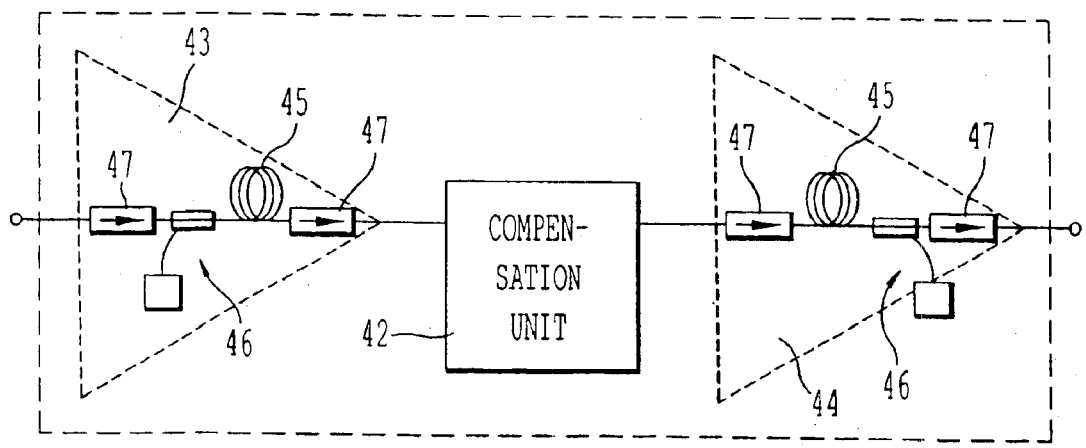
In FIG. 8 a dispersion compensation device suitable for use in the high-speed transmission system.

Preferably, in the presence of a total of 10 between line amplifiers 37 and preamplifier 39, each of the said chromatic dispersion compensation units 42 is designed to compensate around 1550 ps/nm., A diagram of a line amplifier is represented in FIG. 8 by way of illustration.

This amplifier comprises a first stage 43 and a second stage 44, between which is sited the chromatic dispersion compensation unit 42.

Each of the stages 43 and 44 comprises an erbium-doped active fibre 45 and pumping means 46.

One or more optical isolators 47 are moreover present, preferably at the input and output of each stage.

Preferably, at least one stretch of the active fibre 45 and the pumping means 46 are arranged in such a way as to supply a pump wavelength to the active fibre directed in the same sense as the signal in the first stage and in the sense opposite to the signal in the second stage.

In a preferred embodiment the pumping means comprise at least one pump wavelength source (typically a laser, in the case in which spatially coherent pumping is desired, or else, for example, a laser diode array, in the case in which the fibre is designed in such a way as to accept this type of pumping), associated with appropriate means of coupling to the active fibre (for example fusible-fibre couplers or interference filters, or multimode type couplers, in association with double cladding fibres or the like).

Beneficially, the chromatic dispersion compensation unit 42 is sited inside the amplifier, in a position intermediate between the two stages, in this way ensuring that the attenuation afforded thereby does not penalize the performance of the amplifier (in terms of signal/noise ratio or output power).

(Alternatively, in the case in which the characteristics of the system so permit or so advise, the chromatic dispersion compensation unit 42 can also be arranged upstream or downstream of an amplifier, or else in a position independent of the latter.

The chromatic dispersion compensation unit 42 comprises, for example, a stretch of preset length of dispersion-compensating fibre (i.e., for example, a fibre having strongly negative chromatic dispersion in the wavelength band employed for transmission, such as to wholly or partly compensate the positive dispersion in this band of the SI fibres employed for the line) as described for example in the Patent U.S. Pat. No. 5,361,319, or one or more fibre stretches bearing a "chirped" grating, (i.e. having a non-constant grating spacing) linked into the line by means of a circulator, a coupler or the like, so as to reflect in a suitable time sequence the various spectral components of the signal, for example as described in the Patent U.S. Pat. No. 4,239,336, so as to cause a modification to the time profile of the pulse opposite to that caused by the fibre of the line and of such a magnitude as to compensate at least part thereof.

The typical characteristics of a system of the type described are summarized in Table 1 below.

TABLE 1

| | |
|---|---|
| Transmission capability | 16 channels x 10 Gbit/s |
| Length of link | ~1000 km |
| Maximum allowable attenuation | 10 × 25 dB |
| Minimum allowable attenuation | 10 × 20 dB |
| Maximum allowable chromatic dispersion | 18000 ps/nm |
| Minimum allowable chromatic dispersion | 15500 ps/nm |
| Chromatic dispersion compensation | 10 × 1550 ps/nm |
| Output power from line amplifiers | ~20 dBm |
| Number of channels | 8–16 |
| Maximum allowable PMD | ~0.5–1 ps/km$^{1/2}$ |
| Total chromatic dispersion | 100–120% of the compensated dispersion |

Figure 9:
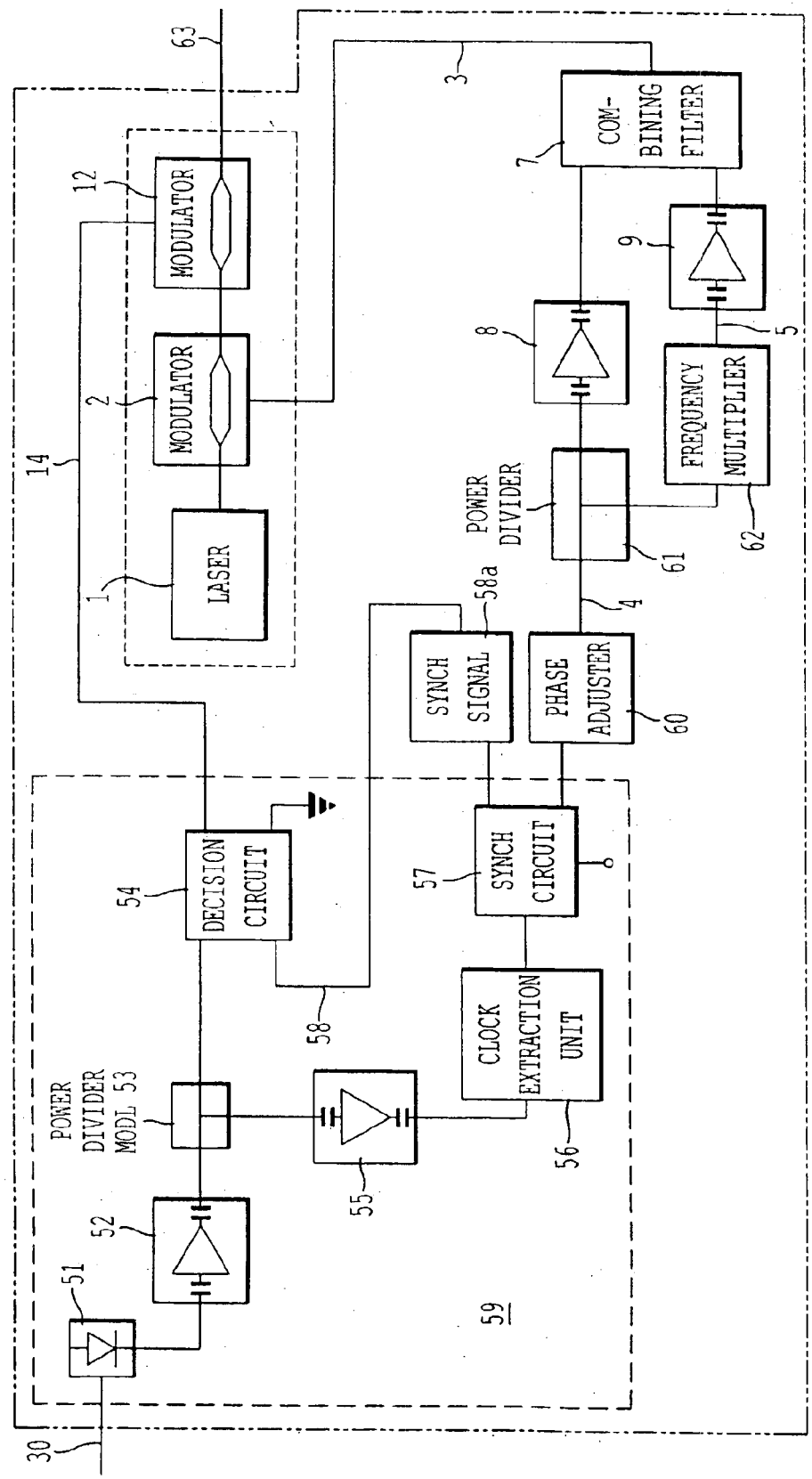
In FIG. 9 a diagram of a device for transforming signals according to the present invention.

A diagram of a transmission interfacing unit, according to an example embodiment of the present invention, is illustrated in FIG. 9.

The interfacing unit comprises a photodetector (photodiode) 51, able to receive the optical signal 30, and to emit an electrical signal, which is supplied to an electronic amplifier 52.

The electronic amplifier 52 possesses an output line, bearing the amplified electrical signal, linked to a power divider node 53, having two respective output arms, the first of which linked to a decision circuit 54, able to generate an electrical signal 14 for driving a signal modulator 12, linked with a continuous-emission laser 1, and a second output arm linked to a second electronic amplifier 55 and from there to a clock extraction unit 56, able to generate a synchronous time signal with the digital information input.

Clock extraction units are sold, for example, by Veritech Microwave, Inc. (N.J., USA).

A synchronization circuit 57, which receives the clock signal generated by the clock extraction unit 56, generates a synchronization signal 58, supplied to the decision circuit 54, and a periodic signal 4, preferably sinusoidal, at the frequency of encoding of the optical signal input, as indicated with reference to FIGS. 1 and 2.

Figure 10:
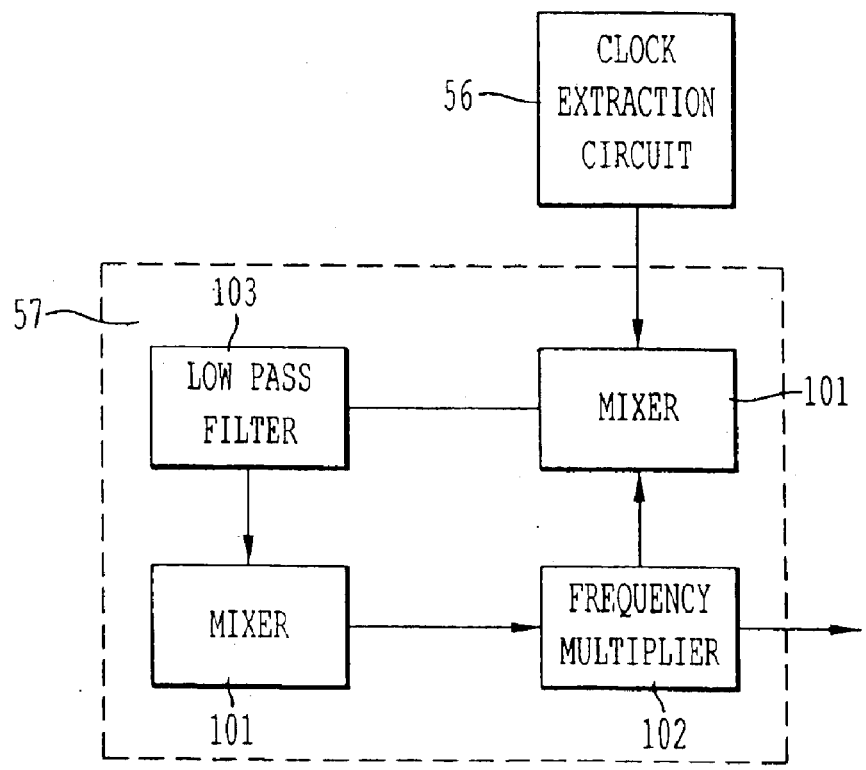
In FIG. 10 an illustrative diagram of a PLL circuit adapted as a synchronization circuit.

In a preferred embodiment the synchronization circuit 57 is a PLL (Phase Locked Loop) circuit, a diagram of which is represented, for illustrative purposes, in FIG. 10.

The 10 GHz signal from the clock extraction circuit 56 is supplied to a first input of a mixer circuit 101, which moreover receives an electrical signal generated by a voltage-controlled oscillator 101, whose output frequency (for example 100 MHz) is preferably supplied to a frequency multiplier 102 (which generates at output a frequency of 10 GHz, multiplying the input by 100) the signal from which is sent both as output and to a second input of the mixer circuit 101.

The output signal from the mixer circuit 101, consisting of a signal containing the sum frequency and the difference frequency of the frequencies input, is supplied, via a low-pass filter 103, to control the output frequency of the voltage-controlled oscillator 101, thus keeping this frequency clamped to that of the signal from the clock extraction circuit 56.

PLL circuits suitable for this purpose are known in the art.

Although PLL type synchronization circuits are preferred, it is also possible to use dielectric-resonant filters, such as for example the circuit which forms part of the O/E Converter device MP 9S042, sold by ANRITSU WILTRON S.p.A., Rome, constructed and marketed for use as an optical reception unit, operating at 10 Gbit/s, or equivalent technologies.

The components from the photodiode 51 to the synchronization circuit 57 and to the decision circuit 54 constitute, as a whole, an optical/electrical conversion unit 59; the function of this unit can also be carried out by employing the O/E Converter device MP 9S042 ANRITSU mentioned above (employing a dielectric-resonator filter), or similar component devices of optical reception units.

Appropriate phase adjustor circuits 58a, 60 are moreover provided at the output of the synchronization circuit 57 along the lines of the respective signals 58 and 4, for the purpose of carrying the synchronization signal 58 and the sinusoidal signal 4 in a preset relative phase relation (taking into account the response characteristics of the various components of the circuit and of the modulators). The sinusoidal signal 4 is then sent, via an arm of a power divider 61, to a first narrow-band amplifier 8 and then to the input at the fundamental frequency of the combining filter 7; the sinusoidal signal 4 is moreover sent, via the other arm of the power divider 61, to a frequency multiplier 62, able to generate at output a signal 5 with a frequency which is a multiple of that input and is in an adjustable phase relation with it, to a second narrow-band amplifier 9, with a preferably adjustable output power, and from there to the second-harmonic input of the combining filter 7.

The signal 3 output by the combining filter 7, consisting of the combination of the signals 4, 5, is then sent to the pulse modulator 2, linked to the output of the laser 1 in series with the signal modulator 12.

The frequency multiplier 62 may moreover beneficially comprise further outputs, at frequencies which are multiples of the input frequency (higher harmonics), which can in turn be supplied to the combining filter 7.

The optical output 63 of the modulator 12 (or of the modulator 2 if they are fitted in the reverse order), constitutes the RZ pulsed transmission signal, at the typical wavelength of the laser 1.

The interfacing circuit moreover comprises elements, not illustrated, for circuit bias control, circuits for driving and controlling the emission wavelength of the laser 1, which are able to keep it constant at the preselected value, while compensating for any external disturbances such as temperature, as also the circuits for controlling the working point (bias) of the modulators 2, 12 and the like, on the basis of the specific requirements of the system.

In the case in which the signal to be transmitted is a signal of electrical type, at the encoding rate envisaged (for example 10 Gbit/s), instead of the interfacing unit described above a transmission unit is used, having essentially the same structure as the interfacing unit, but without the photodiode 51, hence in which the electrical signal input is supplied directly to the input of the amplifier 52.

Moreover in the case in which the time profile of the electrical signal bearing the information available, whether it be generated in this form directly or produced by the photodiode 51, meets sufficient requirements as to lead to an acceptable value of error rate, as defined above, the same electrical signal can also be supplied directly (or after amplification) as input to the modulator 12 to constitute the drive signal therefor.

Moreover in the case in which the aforesaid electrical signal bearing the information is generated close to the optical transmitter, or in which the appropriate clock signal is available anyway from an external origin (for example the same signal generation equipment), this clock signal can be supplied directly to the synchronizing circuit 57, or even to its output.

The system according to the invention thus makes it possible to receive optical signals having the characteristics typical of the transmission units to which this system is linked, and to generate, allied with these signals, RZ pulsed signals essentially devoid of chirp, of intensity and duration which are suitable for allowing propagation in the line without interactions between pulses and between different-wavelength signals, under conditions of self phase modulation for a stretch of this line, in which the intensity of the signal in the optical conductor means (for example the line optical fibre) exceeds a preset value and under substantially linear conditions able to allow compensation for the chromatic dispersion arising therein, in a second stretch of line.

What is claimed is:

1. A method for transmitting an optical signal, comprising:

receiving an optical signal at a pulse modulator;

receiving a composite signal comprising a main signal and a harmonic signal at the pulse modulator, the main signal having a main frequency, the harmonic signal having a harmonic frequency, the harmonic frequency being a harmonic of the main frequency;

modulating the optical signal in accordance with the composite signal to generate a plurality of pulses in the optical signal, each pulse of the plurality of pulses having a duration within the range of twenty to one hundred picoseconds;

receiving the optical signal at a signal modulator;

receiving information at the signal modulator;

coding the information in the plurality of pulses of the optical signal; and sending the optical signal to an optical fiber comprising a step-index fiber.

2. The method of claim 1, further comprising generating the composite signal from the main signal and the harmonic signal by:

receiving the main signal at a first conductive strip of a combining filter, the main signal having a main wavelength, the first conductive strip having a portion proportional to the main wavelength;

receiving the harmonic signal at a second conductive strip of the combining filter; and generating the composite signal from the main signal and the harmonic signal using the first conductive strip and the second conductive strip.

3. The method of claim 1, further comprising generating the composite signal from the main signal and the harmonic signal by:

receiving the main signal at a first input coupled to a first conductive strip of a combining filter, the main signal having a main wavelength, the first conductive strip having a first portion proportional to the main wavelength;

receiving the harmonic signal at a second input coupled to a second conductive strip of the combining filter, the second conductive strip having a second portion proportional to the main wavelength;

isolating the first input from the second input using a third conductive strip; and generating the composite signal from the main signal and the harmonic signal using the first conductive strip and the second conductive strip.

4. The method of claim 1, further comprising:

amplifying the main signal;

amplifying the harmonic signal;

generating the composite signal from the main signal and the harmonic signal; and sending the composite signal directly to the pulse modulator without further amplification.

5. The method of claim 1, further comprising adjusting the duration of each pulse of the plurality of pulses by changing a bias of the pulse modulator.

6. The method of claim 1, further comprising adjusting the duration of each pulse of the plurality of pulses by changing an amplitude of at least one of the main signal and the harmonic signal.

7. The method of claim 1, further comprising adjusting the duration of each pulse of the plurality of pulses by changing a relative phase between the main signal and the harmonic signal.

8. The method of claim 1, further comprising compensating for dispersion of the optical signal by:

receiving the optical signal at a compensation unit comprising a dispersion-compensating fiber; and applying a negative dispersion to the optical signal.

9. The method of claim 1, further comprising compensating for dispersion of the optical signal by:

receiving the optical signal at a compensation unit comprising a grating having a non-constant grating spacing; and applying a negative dispersion to the optical signal.

10. A system for transmitting an optical signal, comprising:

a pulse modulator operable to:

receive an optical signal;

receive a composite signal comprising a main signal and a harmonic signal, the main signal having a main frequency, the harmonic signal having a harmonic frequency, the harmonic frequency being a harmonic of the main frequency; and modulate the optical signal in accordance with the composite signal to generate a plurality of pulses in the optical signal, each pulse of the plurality of pulses having a duration within the range of twenty to one hundred picoseconds; and a signal modulator coupled to the pulse modulator and operable to:

receive the optical signal;

receive information;

code the information in the plurality of pulses of the optical signal; and send the optical signal to an optical fiber comprising a step-index fiber.

11. The system of claim 10, further comprising a combining filter coupled to the pulse modulator and operable to generate the composite signal from the main signal and the harmonic signal by:

receiving the main signal at a first conductive strip of the combining filter, the main signal having a main wavelength, the first conductive strip having a portion proportional to the main wavelength;

receiving the harmonic signal at a second conductive strip of the combining filter; and generating the composite signal from the main signal and the harmonic signal using the first conductive strip and the second conductive strip.

12. The system of claim 10, further comprising a combining filter coupled to the pulse modulator and operable to generate the composite signal from the main signal and the harmonic signal by:

receiving the main signal at a first input coupled to a first conductive strip of the combining filter, the main signal having a main wavelength, the first conductive strip having a first portion proportional to the main wavelength;

receiving the harmonic signal at a second input coupled to a second conductive strip of the combining filter, the second conductive strip having a second portion proportional to the main wavelength;

isolating the first input from the second input using a third conductive strip; and generating the composite signal from the main signal and the harmonic signal using the first conductive strip and the second conductive strip.

13. The system of claim 10, further comprising:

a first narrow band amplifier operable to amplify the main signal;

a second narrow band amplifier operable to amplify the harmonic signal; and a combining filter coupled to the first narrow band amplifier, the second narrow band amplifier, and the pulse modulator, the combining filter operable to:
generate the composite signal from the main signal and the harmonic signal; and
send the composite signal directly to the pulse modulator without further amplification.

14. The system of claim 10, wherein the pulse modulator is further operable to change a bias to adjust the duration of each pulse of the plurality of pulses.

15. The system of claim 10, further comprising a narrow band amplifier coupled to the pulse modulator and operable to change an amplitude of at least one of the main signal and the harmonic signal to adjust the duration of each pulse of the plurality of pulses.

16. The system of claim 10, further comprising a phase adjuster coupled to the pulse modulator and operable to change a relative phase between the main signal and the harmonic signal to adjust the duration of each pulse of the plurality of pulses.

17. The system of claim 10, further comprising a compensation unit comprising a dispersion-compensating fiber and operable to compensate for dispersion of the optical signal by applying a negative dispersion to the optical signal.

18. The system of claim 10, further comprising a compensation unit comprising a grating having a non-constant grating spacing and operable to compensate for dispersion of the optical signal by applying a negative dispersion to the optical signal.

19. A system for transmitting an optical signal, comprising:

means for receiving an optical signal at a pulse modulator;

means for receiving a composite signal comprising a main signal and a harmonic signal at the pulse modulator, the main signal having a main frequency, the harmonic signal having a harmonic frequency, the harmonic frequency being a harmonic of the main frequency;

means for modulating the optical signal in accordance with the composite signal to generate a plurality of pulses in the optical signal, each pulse of the plurality of pulses having a duration within the range of twenty to one hundred picoseconds;

means for receiving the optical signal at a signal modulator;

means for receiving information at the signal modulator;

means for coding the information in the plurality of pulses of the optical signal; and means for sending the optical signal to an optical fiber comprising a step-index fiber.

20. A method for transmitting an optical signal, comprising:

amplifying a main signal and a harmonic signal, the main signal having a main frequency, the harmonic signal having a harmonic frequency, the harmonic frequency being a harmonic of the main frequency;

generating a composite signal from the main signal and the harmonic signal by:
receiving the main signal at a first input coupled to a first conductive strip of a combining filter, the main signal having a main wavelength, the first conductive strip having a first portion proportional to the main wavelength;
receiving the harmonic signal at a second input coupled to a second conductive strip of the combining filter, the second conductive strip having a second portion proportional to the main wavelength;
isolating the first input from the second input using a third conductive strip; and
generating the composite signal from the main signal and the harmonic signal using the first conductive strip and the second conductive strip;

sending the composite signal directly to the pulse modulator without further amplification;

receiving an optical signal at a pulse modulator;

receiving the composite signal comprising the main signal and the harmonic signal at the pulse modulator;

modulating the optical signal in accordance with the composite signal to generate a plurality of pulses in the optical signal, each pulse of the plurality of pulses having a duration within the range of twenty to one hundred picoseconds;

receiving the optical signal at a signal modulator;

receiving information at the signal modulator;

coding the information in the plurality of pulses of the optical signal;

sending the optical signal to an optical fiber comprising a step-index fiber;

adjusting the duration of each pulse of the plurality of pulses by changing a bias of the pulse modulator;

adjusting the duration of each pulse of the plurality of pulses by changing an amplitude of at least one of the main signal and the harmonic signal;

adjusting the duration of each pulse of the plurality of pulses by changing a relative phase between the main signal and the harmonic signal;

compensating for dispersion of the optical signal by:
receiving the optical signal at a compensation unit comprising at least one of a dispersion-compensating fiber and a non-constant grating spacing; and
applying a negative dispersion to the optical signal.

* * * * *